United States Patent [19]

Tsubone et al.

[11] Patent Number: 4,911,978
[45] Date of Patent: Mar. 27, 1990

[54] POLYOLEFIN RESIN FOAMED LAMINATE SHEET AND DOUBLE-SIDE VACUUM FORMING OF THE SAME

[75] Inventors: Masahiro Tsubone; Yoshinori Kajimoto; Toru Yoshimi, all of Ibaraki, Japan

[73] Assignee: Sekisui Kaseihin Kogyo Kabushiki Kaisha, Nara, Japan

[21] Appl. No.: 358,110

[22] Filed: May 30, 1989

[30] Foreign Application Priority Data

May 30, 1988 [JP] Japan ................................ 63-130286

[51] Int. Cl.$^4$ .............................................. B32B 3/26
[52] U.S. Cl. .................................. 428/317.9; 156/285; 264/321; 428/36.5; 428/159; 428/319.7; 428/319.9
[58] Field of Search ................... 428/36.5, 159, 317.9, 428/319.7, 319.9; 264/321; 156/285

[56] References Cited

U.S. PATENT DOCUMENTS 4,288,490 9/1981 Alfter et al. ...................... 428/319.7
4,432,580 2/1984 Lohmar et al. ................. 428/314.4

FOREIGN PATENT DOCUMENTS 63-126739 5/1988 Japan ................................ 428/319.7

*Primary Examiner*—William J. Van Balen
*Attorney, Agent, or Firm*—Armstrong, Nikaido, Marmelstein, Kubovcik & Murray

[57] ABSTRACT

A foamed laminate sheet suitable for thermoforming and a double-side vacuum forming process using the same are disclosed, said foamed laminate sheet being composed of a foamed interlayer comprising a polyolefin resin as a main resinous component and from 0.5 to 35 parts by weight of an inorganic filler per 100 parts by weight of the polyolefin resin, said foamed interlayer having a density of from 0.18 to 0.98 g/cm$^3$, and a polyolefin film laminated on both sides of said foamed interlayer. The foamed laminate sheet exhibits excellent formability, and formings obtained therefrom have excellent heat resistance, oil resistance, heat insulating properties, and strength, with outstanding use in a microwave oven or as a retort food container.

11 Claims, 1 Drawing Sheet

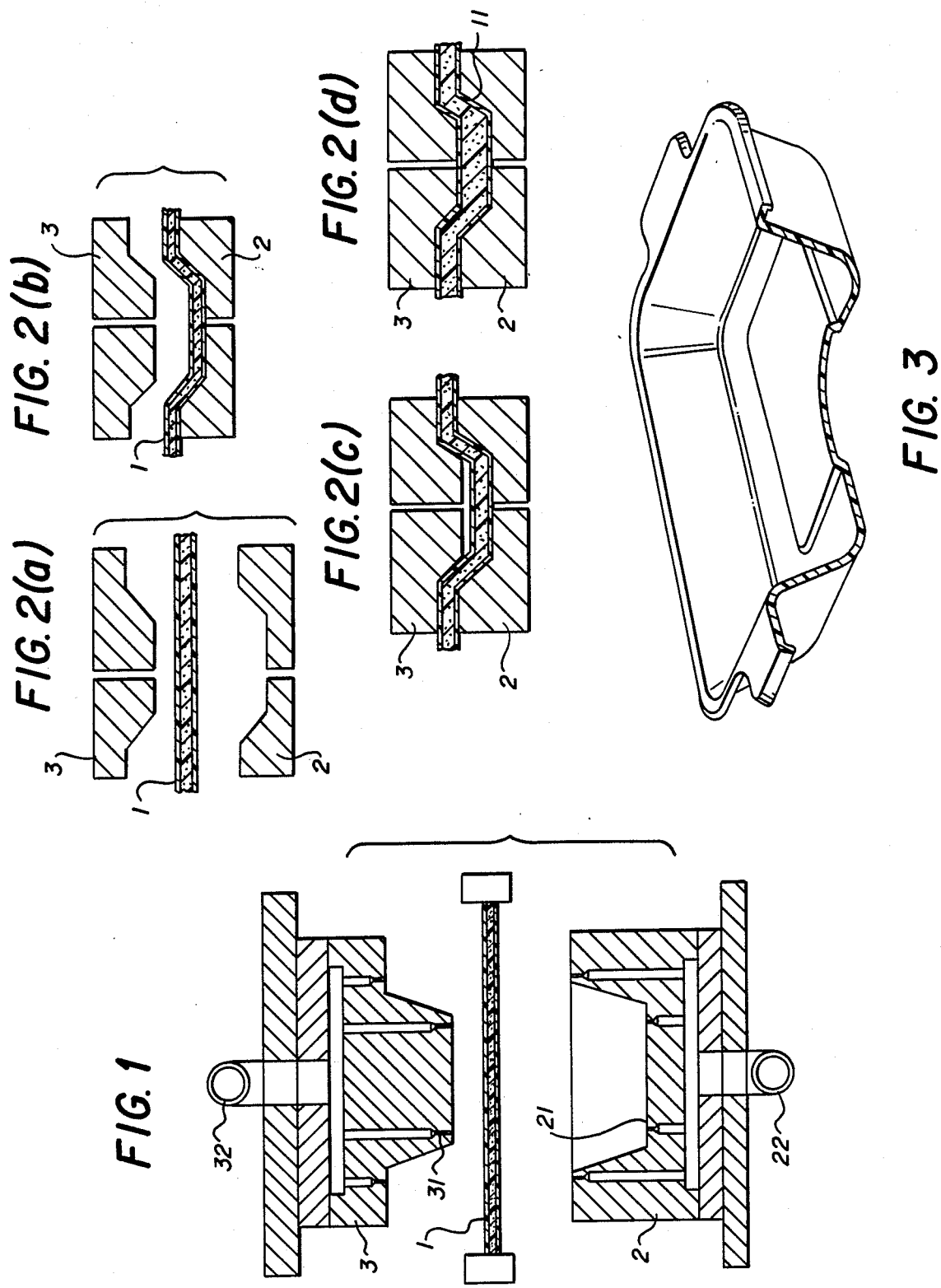

POLYOLEFIN RESIN FOAMED LAMINATE SHEET AND DOUBLE-SIDE VACUUM FORMING OF THE SAME

FIELD OF THE INVENTION

This invention relates to a foamed laminate sheet suited for thermoforming, particularly double-side vacuum forming, comprising a foamed interlayer composed mainly of a polyolefin resin and a polyolefin film laminated on both side thereof. It also relates to a process of double-side vacuum forming using such a foamed laminate sheet in which a relatively cheap polypropylene resin is used to provide heat resistant, oil resistant and thermally insulating food containers with high strength which can be used in a microwave oven or as a retort food container.

BACKGROUND OF THE INVENTION

Known processes for obtaining containers and trays from a thermoplastic resin foamed sheet include a so-called single side vacuum forming technique in which a foamed sheet is heated to cause post-expansion and softening and the foamed sheet is vacuum-formed by the use of a female mold or a male mold to shape it in a desired formed article. However, the foamed sheet decreases with time and also scatters with changes of conditions of preparation of the sheet. Therefore, formings obtained by this process have a scattering thickness, which leads to insufficient strength or poor fitness when piled up, thus resulting in reduced yield of non-defectives.

In order to solve the problems associated with single-side vacuum forming, double-side vacuum forming of thermoplastic resin foamed sheets has been developed as disclosed in JP-B-59-1184 and JP-A-60-192615 (the term "JP-B" as used herein means an "examined published Japanese patent application" and the term "JP-A" means an "unexamined published Japanese patent application"), in which a pair of forming molds with a prescribed gap therebetween and having a clamping frame at the periphery thereof are used, the male mold being set at 50° to 60° C., a heated and plasticized thermoplastic resin foamed sheet is clamped between the male and female molds, the gap is evacuated from the both molds to thereby adibatically expand the sheet to the full of the gap to give a prescribed shape, the formed sheet is cooled, a gas is introduced into the mold cavity to raise the pressure to atmospheric pressure, the molds are opened, and the formed article is removed. The above-cited references describe that the double-side vacuum forming technique produces formings from a foamed sheet of a thermoplastic resin, such as polystyrene and polymers mainly comprising styrene, or a foamed laminate sheet composed of such a foamed sheet and a thermoplastic resin film.

However, the formings obtained by double-side vacuum forming of foamed sheets of polystyrene or thermoplastic resins mainly comprising styrene are inferior in oil resistance, heat resistance, appearance, and hinge effect as compared with those obtained from foamed sheets of polyolefin resins, such as polypropylene and polyethylene.

On the other hand, a foaming compound of a polyolefin resin, particularly polypropylene, dissipates blowing gas from the surface thereof on extrusion foaming and, as a result, a foamed sheet has low post-expandability, thus failing to provide formings having a desired extent of expansion.

SUMMARY OF THE INVENTION

One object of this invention is to eliminate the above-described disadvantages and to provide a polyolefin resin foamed laminate sheet which can provide formings, such as food containers and trays, excellent in heat resistance, oil resistance, thermal insulating properties, and strength.

Another object of this invention is to provide a polyolefin resin foamed laminate sheet having laminated on both sides thereof a polyolefin film, which has improved vacuum formability, particularly double-side vacuum formability.

A further object of this invention is to provide a polyolefin resin foamed laminate sheet containing a polystyrene resin for improving post-expandability and strength.

A still further object of this invention is to provide a polyolefin resin foamed laminate sheet containing an inorganic filler for improving formability.

It has now been found that the above objects of this invention can be accomplished by a polyolefin resin foamed laminate sheet suitable for thermoforming, which is composed of a foamed interlayer comprising 100 parts by weight of a polyolefin resin and from 0.5 to 35 parts by weight of an inorganic filler, said foamed interlayer having a density of from 0.18 to 0.98 g/cm$^3$, and a polyolefin film laminated on both sides of said foamed interlayer.

BRIEF DESCRIPTION OF THE DRAWINGS

FIG. 1 is a schematic cross section of a mold to be used for double-side vacuum forming.

FIGS. 2-a to 2-d are cross sections illustrating the double-side vacuum forming process according to the present invention.

FIG. 3 is an outaway view of the container obtained by the forming process of the present invention.

DETAILED DESCRIPTION OF THE INVENTION

The interlayer of the polyolefin resin foamed laminate sheet of the present invention is a foamed sheet comprising a polyolefin resin as a main resinous component. The polyolefin resin to be used includes polypropylene, polyethylene, polybutene, polymethyl-pentene, mixtures of these polymers, and olefin copolymers having an olefin content of at least 50% by weight, such as ethylene-vinyl acetate copolymers, ethylene-methacrylate copolymers, ethylene-propylene-terpolymers, and ethylene-propylene rubbers.

Expandability of the interlayer can be improved by incorporating a polystyrene resin into the polyolefin resin. The polystyrene resin which can be admixed with the polyolefin resin includes polystyrene resins of general grade, as well as heat-resistant polystyrene resins such as α-methylstyrene copolymers, styrene-maleic anhydride copolymers, styrene-alkylmaleimide copolymers, styrene-methyl methacrylate copolymers, and a mixture of polystyrene and polyphenylene oxide. The polyolefin resin is usually used in an amount of from 50 to 90 parts by weight per 100 parts by weight of the total resinous components. If the amount of the polystyrene resin exceeds 50 parts by weight, the heat resistance decreases.

In order to facilitate blending of the polyolefin resin and the polystyrene resin, the resin composition may further contain from about 2 to 30 parts by weight of a saturated thermoplastic elastomer, e.g., a saturated styrene-based thermoplastic elastomer, per 100 parts by weight of the total resinous components. Thus, the foamed interlayer can be lowered in density and improved in sheet appearance.

In order to endow the foamed laminate sheet with formability to shape, the resin composition for the foamed sheet contains from 0.5 to 35 parts by weight and preferably from 10 to 20 parts by weight of an inorganic filler per 100 parts by weight of the polyolefin resin. Less than 0.5 part of the inorganic filler added would result in high degree of expansion but deteriorates appearance of the resulting formings. Amounts exceeding 35 parts result in deteriorated compatability with the resinous components, failing to provide foamed laminate sheets of low density and satisfactory appearance. Addition of the inorganic filler brings about improvements in heat resistance and stiffness.

The inorganic filler which can be used includes talc, titanium dioxide, clay, calcium carbonate, silica, alumina, glass powders, oyaishi, sand balloons, glass balloons, and inorganic fibers. In addition, metallic powders of aluminum, iron, zinc, etc. are also employable. The inorganic fillers can be used either individually or in combination of two or more thereof. Preferred of these fillers are talc, titanium dioxide, clay, silica and alumina each having a mean grain size of from 1 to 30 μm.

The polyolefin film which can be laminated on both sides of the foamed interlayer is a film made of one or more than one of the above-described polyolefins. In particular, polypropylene film and a film made of a mixture of homopolypropylene and a propylene block copolymer are preferred. The polyolefin film generally has a thickness of from 40 to 80 μm.

For the purpose of preventing bubbling at the time of extrusion molding, and particularly bubbling often occurring in obtaining a high degree of foaming, the polyolefin film layer preferably contains from 0.5 to 10 parts by weight of an inorganic filler selected from the above-enumerated examples per 100 parts by weight of the polyolefin. It should be noted however that addition of too a high content of the filler causes penetration of an oil.

The resin composition for the foamed interlayer advantageously contains a small amount of an additive for improving compatability between the resinous components and the inorganic powders, such as commonly employed silane or titanium coupling agents, various surface active agents for improving dispersibilty, metallic soaps, polyhydric alcohols, and acid anhydrides.

A blowing agent which can be used in the resin composition for the foamed interlayer includes those decomposable on heating to liberate $N_2$ or $CO_2$ and those which are gaseous or liquid at room temperature, e.g., $N_2$, $CO_2$, air, water, alcohols, propane, butane, pentane, trichloromonofluoromethane, dichlorodifluoromethane, monochlorodifluoromethane, 1,2-dichlorotetrafluoro-ethane, 1-chloro-1,1-difluoroethane, methyl chloride, and ethyl chloride. The heat-decomposable blowing agent is mixed with raw materials in advance, and the blowing agent which is gaseous or liquid at room temperature is supplied to the middle of an extruder.

The density of the foamed layer ranges from 0.18 to 0.98 g/cm$^3$. If it is less than 0.18 g/cm$^3$, a pattern of wavy lines is formed on extrusion foaming, and formings obtained from such foamed sheet suffer from poor appearance, deformation and poor stretchability. If it exceeds 0.98 g/cm$^3$, the foamed layer exhibits low post-expandability and is therefore of no use.

The foamed layer comprising the polypropylene resin tends to have an open-cell structure owing to the inorganic filler. The degree of open cells can be expressed in terms of open-cell ratio as determined by means of an air pycnometer (ASTM D2856). The open-cell ratio of the foamed layer is usually 30% or more. A foamed layer having an open-cell ratio of 60% or even more may be vacuum-formed owing to the polyolefin films as external layers.

Laminating of the foamed layer and the film layers can be carried out by usual laminating techniques, such as co-extrusion or adhesion. In the case of co-extrusion, the melt index of the resin composition for the foamed layer and that of the resin composition for the laminating films should be adjusted appropriately.

The formation of the foamed layer is generally carried out by the use of an extruder. More specifically, the resin composition is supplied to an extruder and heat-melted together with a blowing agent. The blowing agent may be supplied at the middle of the extruder and well kneaded into the resin composition. The temperature of the compound is adjusted to an extrusion temperature and fed to a die. Dies to be used include a coathanger die or T-die having a slot whose width is much larger than the thickness, and a ring die having a circular slot. In using the former die, the film extruded from the die is cooled with a roll. The draw ratio in the machine direction is controlled by adjusting the draw-off speed and stress. If desired, the draw ratio in the cross direction may be controlled by clamping the extruded film at both ends. In using the latter die, the tubular film extruded from the circular slot is drawn off along a cylindrical drum while controlling the draw ratio in the machine direction or the cross direction by adjusting the draw-off speed or the drum diameter.

It is desirable that the foamed laminate sheet of the present invention has a percent heat shrinkage as small as possible so as to have high retention of dimension after heat shrinkage. It is also desirable that the shrinkage in the machine direction and that in the cross direction are substantially equal. For example, the foamed laminate sheet preferably has a percent retention of at least 50% and a residual dimension ratio of at least 0.7. The terminology "percent retention" as used herein means a percentage of the dimension after shrinkage to the original dimension in the machine or cross direction when the sheet is heated at 190° C. for 30 minutes. If the percent retention is less than 50%, the percent shrinkage on heating and softening becomes too great to make it difficult to form the sheet to shape. The terminology "residual dimension ratio" as used herein means a ratio of the shorter dimension after heat shrinkage in either the machine direction or the cross direction to the longer dimension in the other direction. If the residual dimension ratio is less than 0.7, the sheets tends to have poor stretchability on forming and the resulting formings tend to have defective appearance. These criteria can be adjusted by controlling the amount of the inorganic filler or the ratio of polyolefin to polystyrene in the foamed layer, the size of a mold, and the like.

It is possible to further laminate films of polyethylene terephthalate, polyphenylene oxide, nylon, polycarbonate, polyvinylidene chloride, polyvinyl alcohol, etc. on the foamed laminate sheet to add various functions, such as gas barrier properties, stiffness, heat resistance, sealing properties, and the like.

The foamed laminate sheet of the present invention is preferably formed by double-side vacuum forming. A forming tool to be used in the double-side vacuum forming is a pair of molds composed of a female mold and a male mold both having a number of vacuum ports for evacuation, each having a diameter of about 0.6 mm and connected to a suction apparatus.

The double-side vacuum forming in accordance with the present invention is illustrated below. The gap between the female and male molds is preferably set at 1.0 to 2.5 times, more preferably 2.0 times, the thickness of the heated and softened foamed laminate sheet. The foamed laminate sheet is clamped at the four corners and previously heated and softened at a temperature between 160° and 190° C. and then transferred to the open space between the molds. At this time, the gap between the molds is desirably 1.0 to 2.5 times, more desirably 2.0 times, the thickness of the heated and softened laminate sheet as stated above. This gap has an influence on strength of the resulting post-expanded and formed article. If it exceeds 2.5 times the thickness of the sheet, the degree of expansion becomes too high, resulting in extremely reduced bending strength. If it is less than 1.0 time, no contribution to improvement of bending strength can be obtained. The mold temperature is preferably 50° C. or lower. In the previously described double-side vacuum forming of polystyrene resin sheets, the mold temperature is set at 50° to 60° C. for evacuation from the mold surfaces to cause post-expansion and cooling. To the contrary, in the present invention in which the formable sheet is composed of a foamed sheet of polyolefin resins, e.g., polypropylene, laminated on both sides thereof a polyolefin film, since polypropylene resins have a large specific heat and poor cooling efficiency, mold temperatures of 50° C. or higher brings no increase of cycle speed but deformation of the laminate sheet. However, too a low mold temperature functions to cool the heated and softened sheet to lose plasticity, thus failing to achieve sufficient vacuum forming. From all these considerations, a suitable mold temperature ranges from about 35° to 45° C. The degree of vacuum in the cavity is usually 500 mmHg vac. or more.

FIG. 1 is a schematic cross section of a mold to be used for matched mold type double-side vacuum forming, in which numerals 1, 2, 3, 21 and 31, and 22 and 32 are a foamed laminate sheet, a female mold, a male mold, vacuum ports, and conduits to a vacuum pump, respectively.

The process of the vacuum forming according to the present invention will be explained with reference to FIG. 2. Foamed laminate sheet 1 composed of a polypropylene resin foamed interlayer having adhered a polypropylene film to both sides thereof is heated and softened at 300° C. for 45 to 50 seconds by means of a far infrared heater. The heated foamed sheet is transferred to the open space between a pair of molds 2, 3 (FIG. 2-a). The molds used here are matching male and female molds. Female mold 2 is connected to a suction apparatus to perform straight vacuum forming (FIG. 2-b). The peripheries of the both molds are then matched (FIG. 2-c), and the cavity is evacuated from male mold 3 to cause expansion-in-mold to obtain a formed article 11 (FIG. 2-d). During the forming the mold temperature is kept at 50° C. or lower, preferably 40° C. After complete expansion, the pressure of the cavity is returned to atmospheric pressure, and the formed article 11 is removed from the molds.

In modified embodiments, the peripheries of the molds are matched while pushing the laminate sheet by the male mold, and then the cavity is evacuated from both of the male and female molds. Alternatively, forming may be effected by drape vacuum forming using the male mold, followed by matching the molds at the peripheries, followed by evacuation from the female side.

The present invention is now illustrated in greater detail by way of the following Examples in view of Comparative Examples, but it should be understood that the present invention is not deemed to be limited thereto. All the parts given are by weight unless otherwise indicated.

Resin materials used in these examples are shown in Table 1.

TABLE 1

| Designation | Kind of Polymer | Trade Name | Grade | Manufacturer | MI Value (g/10 min) | MI Measurement Method |
|---|---|---|---|---|---|---|
| A | Polypropylene | Sumitomo Noblen ® | D-501 | Sumitomo Chemical Co., Ltd. | 0.4 | JIS K-6758 230° C., 2.16 kg |
| B | Polypropylene | Sumitomo Noblen ® | FH-1015 | Sumitomo Chemical Co., Ltd. | 0.5 | JIS K-6758 230° C., 2.16 kg |
| C | Styrene-maleic anhydride copolymer | More Max ® | UG-830 | Idemitsu Petrochemical Co., Ltd. | 1.8 | JIS K-7210 230° C., 2.16 kg |
| D | Styrene-methacrylic acid copolymer | AX Polymer | AX-T 100 | Asahi Chemical Industry Co., Ltd. | 3.7 | JIS K-7210 230° C., 2.16 kg |
| E | Polystyrene | Styron ® | 8703 | Asahi Chemical Industry Co., Ltd. | 1.6 | JIS K-6870 200° C., 5 kg 200° C., 5 kg |
| F | α-Methylstyrene | HS Polymer | HS-400 | Denki Kagaku Kogyo K.K. | 2.1 | Denka Method 250° C., 5 kg |
| G | Saturated thermoplastic elastomer | Taftic ® | H-1011 | Asahi Chemical Industry Co., Ltd. | 13.9 | JIS K-7210 230° C., 5 kg |
| H | Polypropylene | Sumitomo Noblen ® | FS-2011 | Sumitomo Chemical Co., Ltd. | 2.5 | JIS K-6758 230° C., 2.16 kg |
| I | Polypropylene | Sumitomo | AD-571 | Sumitomo Chemical | 0.6 | JIS K-6758 |

TABLE 1-continued

| Designation | Kind of Polymer | Trade Name | Grade | Manufacturer | MI Value (g/10 min) | MI Measurement Method |
|---|---|---|---|---|---|---|
| | | Noblen ® | | Co., Ltd. | | 230° C., 2.16 kg |
| J | Polyethylene | Yukalon ® | HE-30 | Mitsubishi Petrochemical Co., Ltd. | 0.27 | ASTM D1238 190° C., 2.16 kg |
| K | Polyethylene | Petrothene ® | 172J | Tosoh Corporation | 0.38 | ASTM D1238 190° C., 2.16 kg |
| L | Polyethylene terephthalate film | Lumirror ® | F 86 | Toray Industries, Inc. | — | — |
| M | Polypropylene/ polyvinylidene chloride/poly- propylene | Barielon ® CX | μ | Asahi Chemical Industry Co., Ltd. | — | — |

EXAMPLE 1

A polymer mixture consisting of 40 parts of a polypropylene resin A, 30 parts of a polypropylene resin B, 25 parts of a polystyrene resin C, and 5 parts of a saturated thermoplastic elastomer G was uniformly mixed with 12.5 parts of talc as an inorganic filler in an extruder. To the resin composition was added 0.6% by weight of butane (hereinafter abbreviated as "$C_4$") as a blowing agent and the resulting foaming compound was supplied to an extruder. Separately, 55 parts of a polypropylene resin H and 45 parts of a block polypropylene resin I were uniformly mixed in an extruder to prepare a film-forming resin. The above-prepared foaming compound and the film-forming resin were co-extruded to obtain a foamed laminate sheet. The extrusion of the foaming compound was carried out at a resin temperature of 203° C. and at an output ratio of 90 kg/hr. The resulting foamed laminate sheet had a thickness of 1290 μm [50 μm/1185 μm (foamed interlayer)/55 μm] and a basis weight of 608 g/m² [46/512 (foamed interlayer)/50 g/m²], and the foamed interlayer had a density of 0.41 g/cm³ and an open cell ratio of 52%.

A 100 mm-square piece was cut out of the foamed laminate sheet and heated in an oven at 190° C. for 30 minutes. The residual dimension was 56 mm in the machine direction (MD) and 58 mm in the transverse direction (TD), giving a residual dimension ratio MD/TD of 0.97. The foamed laminate sheet had a smooth surface with no bubbles due to gas entrapment.

The foamed laminate sheet as above produced was clamped at the four corners and heated and softened at 300° C. for about 50 seconds by means of a far infrared heater. The sheet heated and softened had a thickness of about 1.2 mm. The sheet heated and softened was double-side vacuum formed into a container by using matched male and female molds. The female mold had a cavity size of 157×124 mm and a depth of 30 mm, and the gap without clamping of the sheet between the male and female molds was 1.5 mm at the bottom part and 1.0 mm at the upright part. The sheet was first subjected to straight vacuum forming using the female mold set at 40° C. After the periphery of the female mold was matched with the periphery of the male mold also set at 40° C., the cavity was evacuated from the vacuum ports provided in both molds to a reduced pressure of 550 mmHg vac. for a matching time of 10 seconds to effect double-side vacuum forming. The sheet exhibited satisfactory formability.

The resulting formed container had a shape as shown in FIG. 3 and a thickness of 1.8 mm at the bottom part and 1.2 mm at the upright part and a dimension (excluding the grip parts) of 157 mm in length, 124 mm in width and 30 mm in depth.

The tray had a density of 0.33 g/cm³. When it was heated in a Geer oven set at 130° C. for 30 minutes, the dimensional change was within 2%, proving of excellent heat resistance of the tray. These results are shown in Table 2.

EXAMPLES 2 TO 16

A foamed laminate sheet was produced in the same manner as in Example 1, except for changing the composition of the foaming compound for the foamed interlayer and the composition of the film-forming resin material as shown in Table 2. The properties of the foamed laminate sheet and formability in double-side vacuum forming as carried out in the same manner as in Example 1 are shown in Table 2.

In Example 15, polyethylene terephthalate films were coated on the both sides of a foamed layer in a separate step; in Example 16, a polypropylene/polyvinylidene chloride/polypropylene laminate film was laminated on one side of a film/foamed layer/film foamed laminate sheet in a separate step; and in Example 14, forming was carried out by use of a far infrared heater of 180° C. for about 50 seconds.

The abbreviate "H.C" for the blowing agent used in Examples 9 and 10 signifies Hydrocellol ® (a mixture of sodium bicarbonate and citric acid, made by Beringer AG).

In each of Examples 2 to 16, an actual gap between the molds increased corresponding to the thickness of a clamp because a softened foamed laminate sheet was clamped.

In Table 2, each of the ratings used for the evaluation is as follows.

(Appearance of Sheet)
Excellent: The smoothness was very good.
Good: The smoothness was good.
Poor: The surface was uneven.
(Bubble)
Good: No bubble was present.
Poor: Bubbling occurred between the foamed layer and the film.
(Appearance of Formed Article)
Excellent: A pattern of the molds was reproduced very well, and no crack was found in the corners at the bottom part of a formed article.

Good: A pattern of the molds was reproduced well, and no crack was found in the corners at the bottom part of a formed article.

Fair: A dent was slightly found at the upright part of a formed article, but no crack was found in the corners at the bottom part of the formed article.

Poor: A dent was greatly found at the upright part of a formed article, and cracks were greatly found in the corners at the bottom part of the formed article.

COMPARATIVE EXAMPLES 1 AND 2

A foamed laminate sheet was produced in the same manner as in Example 1, except for using the inorganic filler in an amount less than (Comparative Example 1) or more than (Comparative Example 2) the range specified in the present invention. The properties of the resulting foamed laminate sheets and their formability in double-side vacuum forming as carried out in the same manner as in Example 1 are shown in Table 2.

In Comparative Example 1 wherein the amount of talc as the filler was less than 0.5 part, both of the appearance of sheet and the appearance of formed article were not satisfactory.

In Comparative Example 2 wherein the amount of talc as the filler exceeded 35 parts, not only both of the appearance of sheet and the appearance of formed article were not satisfactory, but bubbling between the foamed layer and the film occurred.

TABLE 2-(1)

|  | Example 1 | Example 2 | Example 3 | Example 4 | Example 5 |
|---|---|---|---|---|---|
| Resin Composition: | | | | | |
| Foamed Interlayer (part) | A/B/C/G = 40/30/25/5 | B/C/G = 70/25/5 | B/C = 75/25 | A/B/C/G = 40/45/10/5 | A/B/C/G = 40/5/50/5 |
| External Film Layer (part) | H/I = 55/45 | H/I = 55/45 | H/I = 55/45 | H/I = 55/45 | H/I = 55/45 |
| Amount of Talc (part) | 12.5 | 0.5 | 0.5 | 12.5 | 12.5 |
| Blowing Agent (% by wt.) | $C_4$ 0.6 | $C_4$ 0.8 | $C_4$ 0.1 | $C_4$ 0.5 | $C_4$ 0.7 |
| Temp. of Foaming Resin (°C.) | 203 | 202 | 202 | 201 | 200 |
| Extrusion Output (kg/hr) | 90 | 90 | 91 | 89 | 92 |
| Total Thickness (μm) | 1290 | 2954 | 2428 | 1161 | 2659 |
| (Film/Foamed Layer/Film) | 50/1185/55 | 51/2847/55 | 50/2326/52 | 49/1059/53 | 50/2555/54 |
| Total Basis Weight (g/cm$^3$) | 608 | 608 | 602 | 601 | 605 |
| (Film/Foamed Layer/Film) | 46/512/50 | 46/512/50 | 45/510/47 | 44/509/48 | 45/511/49 |
| Density of Foamed Layer (g/cm$^3$) | 0.41 | 0.18 | 0.22 | 0.48 | 0.20 |
| Open Cell Ratio (%) | 52 | 30 | 35 | 56 | 48 |
| Residual Dimension (190° C. × 30 min.): | | | | | |
| MD | 56 | 52 | 55 | 62 | 60 |
| TD | 58 | 74 | 71 | 63 | 72 |
| MD/TD | 0.97 | 0.70 | 0.77 | 0.98 | 0.83 |
| Dimensional Change (130° C. × 30 min.) | within 2% | within 2% | within 2% | within 2% | within 2% |
| Appearance of Sheet | excellent | good | good | excellent | excellent |
| Bubble | good | good | good | good | good |
| Thickness of Formed Article (mm) | | | | | |
| bottom part | 1.8 | 4.4 | 3.2 | 1.6 | 4.1 |
| upright part | 1.2 | 2.9 | 2.2 | 1.1 | 2.7 |
| Density of Foamed Layer of Formed Article (g/cm$^3$) | 0.33 | 0.14 | 0.19 | 0.38 | 0.15 |
| Appearance of Formed Article | excellent | good | good | excellent | excellent |

TABLE 2-(2)

|  | Example 6 | Example 7 | Example 8 | Example 9 | Example 10 |
|---|---|---|---|---|---|
| Resin Composition: | | | | | |
| Foamed Interlayer (part) | A/B/D/G = 40/30/25/5 | A/B/F/G = 40/30/25/5 | A/B/E/G = 40/30/25/5 | B/C/G = 70/25/5 | B/C/G = 70/25/5 |
| External Film Layer (part) | H/I = 55/45 | H/I = 55/45 | H/I = 55/45 | H/I = 55/45 | H/I = 55/45 |
| Amount of Talc (part) | 12.5 | 12.5 | 12.5 | 0.5 | 0.5 |
| Blowing Agent (% by wt.) | $C_4$ 0.6 | $C_4$ 0.7 | $C_4$ 0.8 | (H.C) 0.3 | $C_4$ 0.6 + H.C 0.3 |
| Temp. of Foaming Resin (°C.) | 202 | 202 | 201 | 208 | 201 |
| Extrusion Output (kg/hr) | 91 | 90 | 92 | 89 | 90 |
| Total Thickness (μm) | 1442 | 1316 | 1263 | 1064 | 2783 |
| (Film/Foamed Layer/Film) | 52/1336/54 | 50/1214/52 | 50/1160/53 | 48/964/52 | 52/2674/57 |
| Total Basis Weight (g/cm$^3$) | 604 | 603 | 604 | 601 | 606 |
| (Film/Foamed Layer/Film) | 47/508/49 | 46/510/47 | 45/511/48 | 43/511/47 | 47/508/51 |
| Density of Foamed Layer (g/cm$^3$) | 0.38 | 0.42 | 0.44 | 0.53 | 0.19 |
| Open Cell Ratio (%) | 54 | 58 | 61 | 31 | 53 |
| Residual Dimension (190° C. × 30 min.): | | | | | |
| MD | 54 | 56 | 57 | 61 | 54 |
| TD | 57 | 58 | 60 | 64 | 73 |
| MD/TD | 0.95 | 0.97 | 0.95 | 0.95 | 0.74 |
| Dimensional Change (130° C. × 30 min.) | within 2% | within 2% | within 2% | within 2% | within 2% |
| Appearance of Sheet | excellent | excellent | good | excellent | excellent |
| Bubble | good | good | good | good | good |
| Thickness of Formed Article (mm) | | | | | |
| bottom part | 2.0 | 1.8 | 1.7 | 1.5 | 3.8 |
| upright part | 1.3 | 1.2 | 1.1 | 1.0 | 2.5 |
| Density of Foamed Layer of Formed Article (g/cm$^3$) | 0.31 | 0.34 | 0.36 | 0.41 | 0.16 |
| Appearance of Formed Article | excellent | excellent | good | excellent | excellent |

TABLE 2-(3)

|  | Example 11 | Example 12 | Example 13 | Example 14 | Example 15 | Example 16 | Comparative Example 1 | Comparative Example 2 |
|---|---|---|---|---|---|---|---|---|
| Resin Composition: | | | | | | | | |
| Foamed Interlayer (part) | B/C/G = 70/25/5 | A/B/C = 40/35/25 | A/B/C = 40/35/25 | J = 100 | B/C/G = 70/25/5 | A/B/C/G = 40/30/25/5 | B/C/G = 70/25/5 | A = 100 |
| External Film layer (part) | H/I=55/45 | H/I=55/45 | H/I=55/45 | K = 100 | L | H/I=55/45 M = 5 | H/I=55/45 | H/I=55/45 |
| Amount of Talc (part) | 0.5 | 35 | 30 | 5 | 5 | 12.5 | 0.2 | 40 |
| Blowing Agent (% by wt.) | $C_4$ 0.8 | $C_4$ 0.5 | $C_4$ 0.6 | $C_4$ 0.5 | $C_4$ 0.8 | $C_4$ 0.6 | $C_4$ 0.9 | $C_4$ 0.5 |
| Temp. of Foaming Resin (°C.) | 198 | 203 | 202 | 120 | 203 | 202 | 202 | 204 |
| Extrusion Output (kg/hr) | 93 | 90 | 91 | 91 | 91 | 90 | 90 | 89 |
| Total Thickness (μm) | 2414 | 626 | 1120 | 2235 | 2913 | 1355 | 2642 | 617 |
| (Film/Foamed Layer/Film) | 51/2305/58 | 52/514/60 | 51/1010/59 | 49/2126/60 | *25/2863/25 | 55/1185/55/60 | 53/2530/59 | 51/513/53 |
| Total Basis Weight (g/cm³) | 605 | 605 | 604 | 605 | 585 | 666 | 607 | 602 |
| (Film/Foamed Layer/Film) | 46/507/52 | 47/504/54 | 46/505/53 | 45/505/55 | 35/515/35 | 50/512/50/54 | 48/506/53 | 46/508/48 |
| Density of Foamed Layer (g/cm³) | 0.22 | 0.98 | 0.5 | 0.31 | 0.36 | 0.41 | 0.20 | 0.99 |
| Open Cell Ratio (%) | 35 | 95 | 91 | 33 | 30 | 52 | 22 | 98 |
| Residual Dimension (190° C. × 30 min.): | | | | | | | | |
| MD | 38 | 85 | 60 | 54 (120° C. × 30 min.) | 56 (200° C. × 30 min.) | 55 | 41 | 91 |
| TD | 76 | 87 | 65 | 76 | 75 | 76 | 74 | 92 |
| MD/TD | 0.50 | 0.98 | 0.92 | 0.71 | 0.75 | 0.72 | 0.55 | 0.99 |
| Dimensional Change (130° C. × 30 min.) | within 2% | within 2% | within 2% | within 2% (80° C. × 30 min.) | within 2% (135° C. × 30 min.) | within 2% | within 2% | within 2% |
| Appearance of Sheet | good | good | excellent | good | good | excellent | poor | poor |
| Bubble | good | good | good | good | good | good | good | poor |
| Thickness of Formed Article (mm) | | | | | | | | |
| bottom part | 3.4 | 0.9 | 1.5 | 3.4 | 4.4 | 1.8 | 3.6 | 0.9 |
| upright part | 2.3 | 0.6 | 1.0 | 2.3 | 2.9 | 1.2 | 2.4 | 0.6 |
| Density of Foamed Layer of Formed Article (g/cm³) | 0.18 | 0.67 | 0.39 | 0.23 | 0.28 | 0.32 | 0.17 | 0.70 |
| Appearance of Foamed Article | fair | good | excellent | good | good | excellent | poor | poor |

As described above, since the polyolefin resin foamed laminate sheet according to this invention is incorporated with an inorganic filler, its formability is satisfactory. Further, since films are laminated on the both sides of a foamed interlayer, it is suitable for double-side vacuum forming.

Furthermore, formed articles produced by forming the polyolefin resin foamed laminate sheet according to this invention exhibit superior heat resistance and oil resistance and can be used as a heat resistant food container capable of withstanding use in a microwave oven or as a retort food container. However, the foamed interlayer composed mainly of a polyethylene resin does not have heat resistance to heating by use of a microwave oven. Further, this heat resistant food container is good in thermal insulation due to the presence of a foamed interlayer, it exhibits an advantage that it can be handed directly after heating in a microwave oven to thereby make a food contained therein difficult to cool.

Moreover, since forming losses of the foamed laminate sheet of this invention and containers after the use can be incorporated into the resin for the foamed interlayer, wastes such as forming losses and containers after the use can be effectively reused. This means that the foamed laminate sheet of this invention or formed articles therefrom can be inexpensively provided.

While the invention has been described in detail and with reference to specific embodiments thereof, it will be apparent to one skilled in the art that various changes and modifications can be made therein without departing from the spirit and scope thereof.

What is claimed is:

1. A foamed laminate sheet suitable for thermoforming, which is composed of a foamed interlayer comprising a polyolefin resin as a main resinous component and from 0.5 to 35 parts by weight of an inorganic filler per 100 parts by weight of the polyolefin resin, said foamed interlayer having a density of from 0.18 to 0.98 g/cm³, and a polyolefin film laminated on both sides of said foamed interlayer.

2. A foamed laminate sheet as claimed in claim 1, wherein said polyolefin resin is a polypropylene resin.

3. A foamed laminate sheet as claimed in claim 1, wherein said foamed interlayer further comprises a polystyrene resin.

4. A foamed laminate sheet as claimed in claim 3, wherein said foamed interlayer further comprises from 2 to 30 parts by weight of a saturated thermoplastic elastomer per 100 parts by weight of the total resinous components.

5. A foamed laminate sheet as claimed in claim 1, wherein said inorganic filler is present in an amount of from 10 to 20 parts by weight per 100 parts by weight of the polyolefin resin.

6. A foamed laminate sheet as claimed in claim 1, wherein said polyolefin film contains from 0.5 to 10 parts by weight of an inorganic filler per 100 parts by weight of the polyolefin.

7. A process of double-side vacuum forming of a polyolefin resin foamed laminate sheet by using male and female molds, in which a foamed laminate sheet composed of a polyolefin resin foamed interlayer having a density of from 0.18 to 0.98 g/cm$^3$ and a polyolefin film laminated on both sides of said interlayer is vacuum-formed between the male and female molds having a gap therebetween, said gap being from 1.0 to 2.5 times the thickness of the foamed laminate sheet heated and softened.

8. A process of double-side vacuum forming as claimed in claim 7, wherein said foamed interlayer comprises 100 parts by weight of a polyolefin resin and from 0.5 to 35 parts by weight of an inorganic filler.

9. A process of double-side vacuum forming as claimed in claim 7, wherein said male and female molds are set at a temperature of 50° C. or lower.

10. A formed article obtained by double-side vacuum forming of a polyolefin resin foamed laminate sheet by using male and female molds, in which a foamed laminate sheet composed of a polyolefin resin foamed interlayer having a density of from 0.18 to 0.98 g/cm$^3$ and a polyolefin film laminated on both sides of said interlayer is vacuum-formed between the male and female molds having a gap therebetween, said gap being from 1.0 to 2.5 times the thickness of the foamed laminate sheet heated and softened.

11. A formed article as claimed in claim 10, wherein said polyolefin resin is a polypropylene resin.

* * * * *